Figure 1:
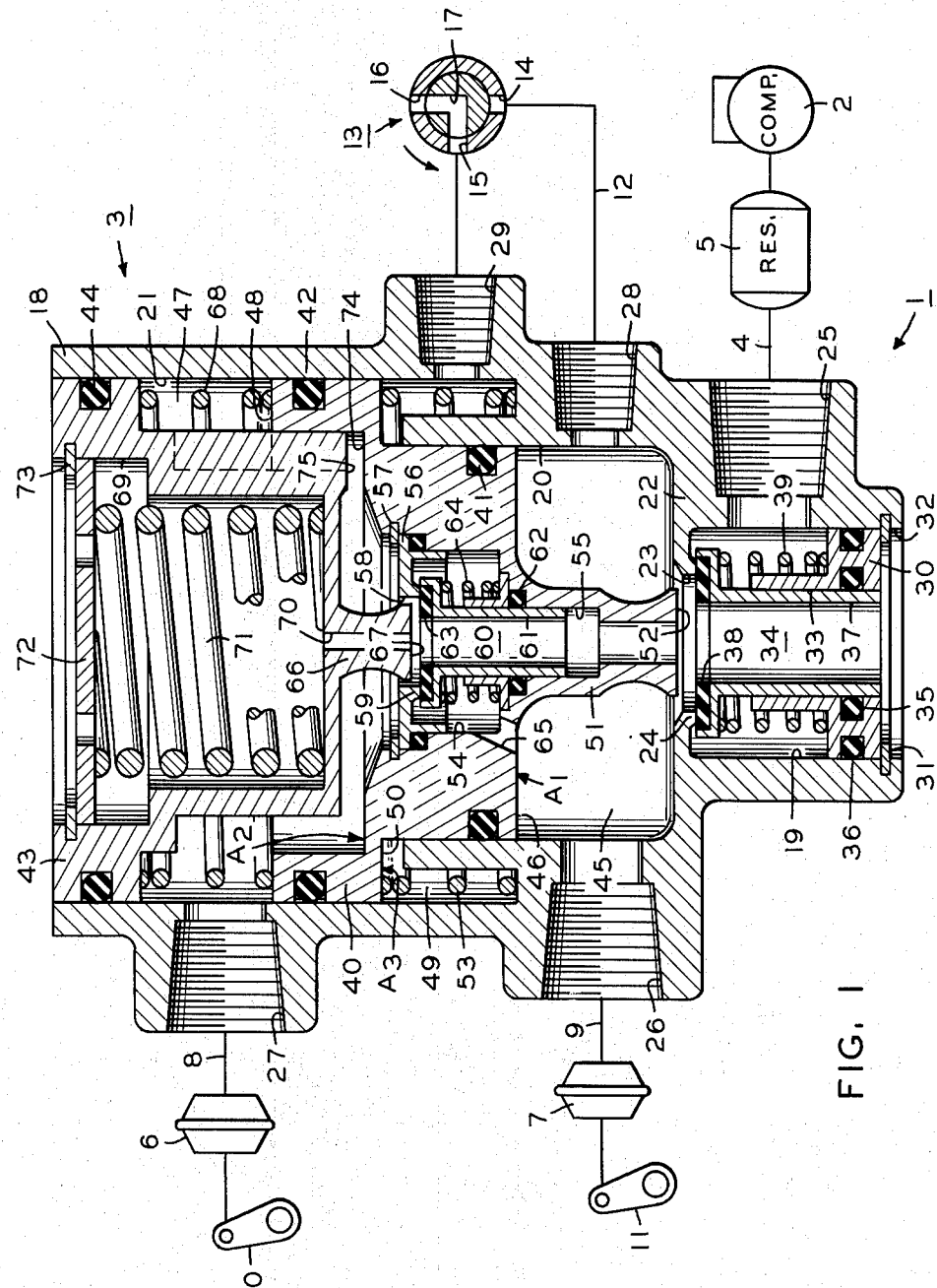

Jan. 4, 1966

R. C. BUELER 3,227,495

DUAL SELF-LAPPING CONTROL VALVE

Filed March 19, 1964

2 Sheets-Sheet 1

INVENTOR
RICHARD C. BUELER
BY
*Joseph E. Papin*

INVENTOR
RICHARD C. BUELER
BY
Joseph E. Papin

United States Patent Office 3,227,495
Patented Jan. 4, 1966

3,227,495
DUAL SELF-LAPPING CONTROL VALVE
Richard C. Bueler, Glendale, Mo., assignor to Wagner Electric Corporation, St. Louis, Mo., a corporation of Delaware
Filed Mar. 19, 1964, Ser. No. 353,141
17 Claims. (Cl. 303—52)

This invention pertains to fluid pressure systems and in particular to control valves therefor of the ratio application type.

An object of the present invention is to provide a fluid pressure system in which fluid pressure is applied by manually controlled means from a single fluid pressure source to a pair of fluid pressure responsive motors in a predetermined ratio.

Another object of the present invention is to provide a control valve having applied force responsive means therein for predetermining the ratio between fluid pressures applied to separate fluid pressure responsive motors from a source of fluid pressure.

Still another object of the present invention is to provide a control valve having applied force responsive means therein for controlling the application of fluid pressure from a single source of fluid pressure to a pair of fluid pressure responsive motors and means for selectively predetermining the ratio between the magnitudes of said applied fluid pressures.

These and other objects and advantages of the present invention will become apparent hereinafter.

Briefly, the invention comprises means for controlling the application of fluid pressure from a source of fluid pressure to a pair of fluid pressure responsive servo motors in a predetermined ratio including a pair of application means movable in response to an applied force to effect the application of fluid pressure from said source to each of said motors in the predetermined ratio, and the invention also includes means for subjecting one of the application means either to the atmosphere or to the fluid pressure applied to one of said motors to effect a ratio between the applied fluid pressures different than the predetermined ratio.

The invention also consists in the parts and arrangements and combinations of parts hereinafter described and claimed in the following specification, reference being had to the accompanying drawings which form a part of said specification wherein like numerals refer to like parts wherever they occur.

Figure 2:
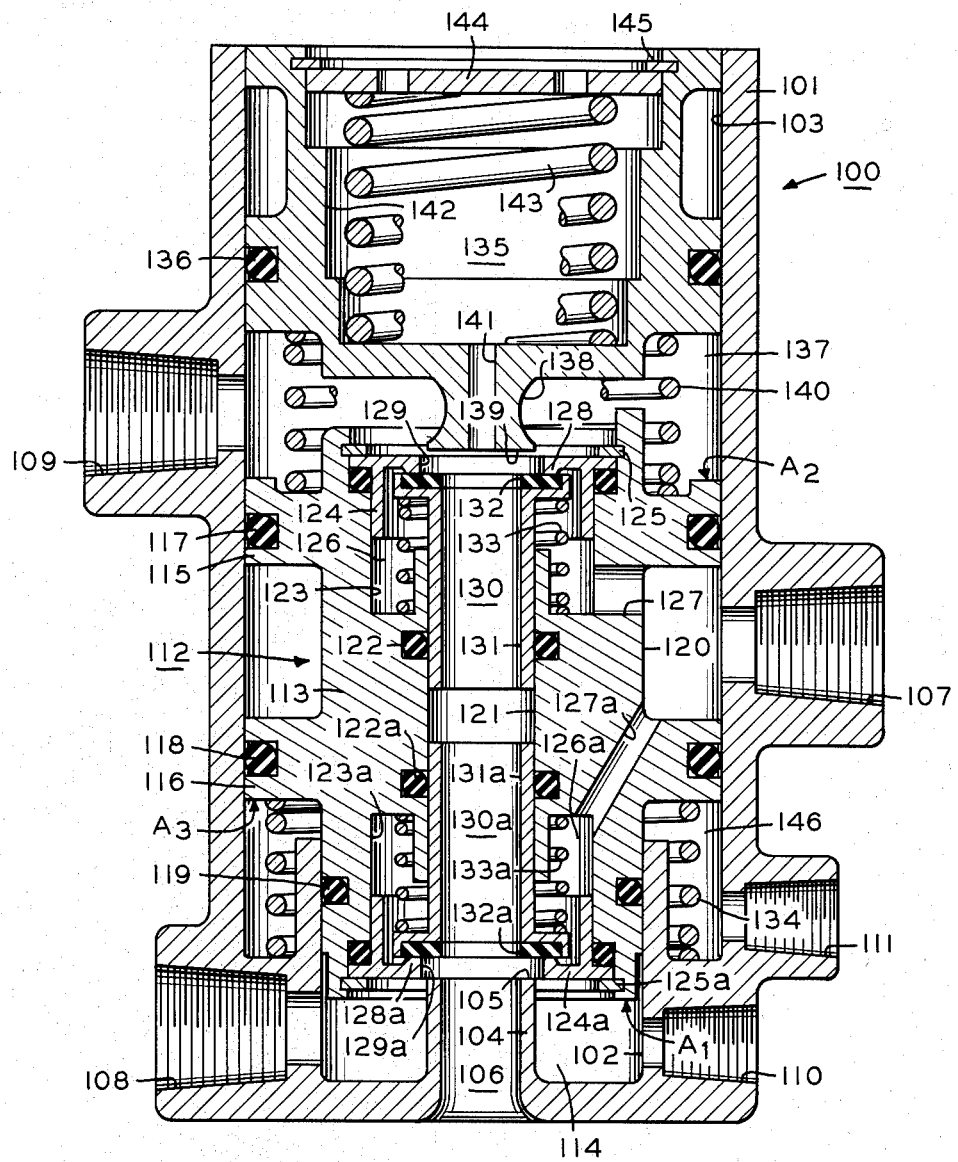

In the drawings which illustrate embodiments of the invention,

FIGURE 1 is a diagrammatic view of a fluid pressure system showing a control valve therein in cross-section embodying the present invention, and FIGURE 2 is a cross-sectional view of another control valve embodying the present invention for connection in the system of FIGURE 1.

Referring now to FIG. 1, a fluid pressure system 1 is shown having fluid pressure generating means, such as a compressor 2, connected with the inlet port of a control or application valve 3 by a conduit 4 with a reservoir 5 interposed therein, said reservoir and compressor forming, in combination, a source of fluid pressure. Fluid pressure responsive motors or brake chambers 6, 7 are connected by conduits 8, 9 to a pair of outlet ports provided in the control valve 3, and said motors are operatively connected with slack adjusters 10, 11 to control the energization of vehicle brake assemblies (not shown). Another conduit 12 is connected between a pair of ratio ports provided in the control valve 3, and an operator controlled two-way or hand valve 13 is connected in said conduit. The two-way valve 13 is provided with connecting ports 14, 15 which are serially connected in the conduit 12 and an atmosphere port 16, and rotatable passage means 17 is selectively movable between said ports. To complete the description of the system 1, the passage means 17 in one position, as shown, connects the connecting and atmosphere ports 15, 16 in open pressure fluid communication, and upon rotation thereof in a counterclockwise direction (as shown by the directional arrow) to its other position, said passage means interrupts pressure fluid communication between the connecting and atmosphere ports 15, 16 and establishes open pressure fluid communication between the connecting ports 14, 15.

The application valve 3 is provided with a housing 18 having a bore 19 therein which forms an inlet chamber and a pair of stepped counterbores 20, 21 in axial alignment with said bore. The housing 18 is provided with an integrally formed, radially extending wall 22 between the bore 19 and counter bore 20, and a connecting passage 23 extends through said wall between said bore and counterbore, said wall having a valve seat 24 thereon in circumscribing relation with said connecting passage. An inlet port 25 which receives the conduit 4, as previously mentioned, is provided in the housing 18 connecting with the bore 19, and outlet ports 26 and 27 which receive conduits 9 and 8, as previously mentioned, are provided in said housing connecting with counterbores 20 and 21, respectively. Ratio ports 28 and 29 which receive the conduit 12, as previously mentioned, are also provided in the housing 18 connecting with the counterbores 20 and 21 adjacent the lower ends thereof, respectively.

A valve guide member 30 is positioned in the bore 19 against displacement by a snap ring and groove assembly 31 provided adjacent the lower end of said bore, said lower end of said bore forming an exhaust port 32. The valve guide member 30 is provided with an axial valve bore 33 in which a valve element 34 is slidably received, and seals 35, 36 are carried in said valve guide member in sealing engagement with said valve member and the housing bore 19, respectively. The valve element 34 is provided with an axial exhaust passage 37 therethrough, and an annular resilient seal or disc 38 is provided on the upper end of said valve element in circumscribing relation with said exhaust passage. A valve spring 39 biased between the valve guide member 30 and the valve element 34 normally urges the valve element seal 38 into sealing engagement with the valve seat 24 provided on the housing wall 22 to normally interrupt pressure fluid communication through the connecting passage 23 between the inlet and outlet ports 25, 26 while establishing pressure fluid communication between said outlet port and the exhaust port 32 through said connecting passage and the valve element exhaust opening 37.

A stepped application member or ratio piston 40 is slidable in the counterbores 20, 21 between the outlet ports 26, 27 having seals 41, 42 therein in sealing engagement with said counterbores, respectively, and another application member or reaction piston 43 is slidably received in the counterbore 21 between the open end thereof and the outlet port 27 having a seal 44 therein in sealing engagement with said counterbore 21. An outlet chamber 45 is defined in the counterbore 20 between the lower end portion 46 of the ratio piston 40 and the housing wall 22 in open pressure fluid communication with the connecting passage 23 and the outlet port 26, said ratio piston lower end portion 46 having an effective fluid pressure responsive area $A_1$ in said outlet chamber. Another outlet chamber 47 is defined in the counterbore 21 between the upper end portion 48 of the ratio piston 40 and the reaction piston 43 in open pressure fluid communication with the outlet port 27, said ratio piston upper end portion having an effective pressure fluid responsive area $A_2$ in said outlet chamber. An annular expansible ratio or control chamber 49 is also provided in the housing 18 between a shoulder 50 on the ratio piston 40 and the shoulder formed between the housing counterbores 20, 21 and between said ratio piston and the side wall of said counterbore 21. The control chamber 49 is connected in open pressure fluid communication with the ratio port 29, and the ratio piston shoulder 50 has an effective pressure fluid responsive area $A_3$ in said control chamber substantially equal to the difference between the ratio piston areas $A_1$ and $A_2$.

An extension 51 is integrally provided on the ratio piston end portion 46 for movement through the connecting passage 23, and a valve seat 52 is provided on the lower or free end of said extension for engagement with the valve element 34, said valve seat being normally predeterminately spaced from said valve element by a return spring 53 biased between the ratio piston shoulder 50 and the housing 18. Stepped bores 54, 55 are axially provided through the ratio piston and extension 40, 51, and a closure member 56 having a connecting passage 58 therethrough is sealably positioned in the upper end of the stepped bore 54 by a snap ring and groove assembly 57, said closure member having a valve seat 59 provided thereon in circumscribing relation with said connecting passage. Another valve element 60 having an axial exhaust passage 61 therethrough is slidably received in the stepped piston bore 55 in sealing engagement with a seal 62 carried therein. The valve element 60 is provided with an annular resilient seal or disc 63 adjacent the upper end thereof in circumscribing relation with the exhaust passage 61, and a valve spring 64 is interposed between the shoulder provided at the juncture of the stepped piston bores 54, 55 and said valve element to normally urge the valve seal 63 into sealing engagement with the closure member valve seat 59. In this manner, the closure member connecting passage 58, the valve element exhaust opening 61, and the ratio piston bore 55 provide an exhaust passage normally in open communication with the outlet port 27 through the outlet chamber 47 and with the exhaust port 32 through the outlet chamber 45, the housing wall connecting passage 23 and the valve element exhaust opening 37, and the ratio piston bore 54 forms a valve chamber which is connected in open pressure fluid communication with the outlet chamber 45 by a passage 65 in the ratio piston 40.

The reaction piston 43 is provided with an integral extension 66 for movement through the ratio piston connecting passage 58, and a valve seat 67 is provided on the free or lower end thereof for sealing engagement with the valve element 60. A piston return spring 68 is biased between the ratio and reaction pistons 40, 43 to normally maintain the extension valve seat 67 in predetermined spaced reation with the valve element 60. A stepped metering spring bore 69 is axially provided in the reaction piston 43, and an auxiliary exhaust opening 70 is axially provided through the extension 66 intersecting with the lower end wall of said metering spring bore. A precompressed metering spring 71 is biased between the lower end wall of the metering spring bore 69 and a force receiving plate or piston 72 which is slidably received in said metering spring bore, said force receiving plate being retained against displacement from said metering spring bore by a snap ring and groove assembly 73 provided adjacent to the upper end of said metering spring bore. To complete the description of the application valve 3, a pair of opposed abutment surfaces 74, 75 are provided on the ratio and reaction pistons 40, 43 being predeterminately spaced apart by the return spring 68 a distance greater than the normal distance between the extension valve seat 67 and the valve element 60.

In the operation, assume that the component parts of the system 1 and application valve 3 are positioned, as previously described, and as shown to effect a ratio braking application. If the operator desires to effect the ratio braking application, a manually applied force on the force receiving plate 72 concertly moves the ratio and reaction pistons 40, 43 downwardly against the compressive forces of the return springs 53, 68 which are for purposes of illustration assumed to be substantially balanced. The downward movement of the ratio and reaction pistons 40, 43 serves to engage the valve seats 52, 67 on the piston extensions 51, 66 with the valve elements 34, 60 to close the exhaust openings 37, 61; therefore, pressure fluid communication between the outlet ports 26, 27 and the exhaust port 32 is interrupted. Further downward movement of the ratio and reaction pistons 40, 43 serves to disengage the valve elements 34, 60 from the valve seats 24, 59 to open the connecting passages 23, 58 and establish pressure fluid communication between the inlet port 25 and the outlet ports 26, 27. In this manner, pressure fluid flows from the reservoir 5 through the conduit 4, the inlet port 25, the inlet chamber 19, the connecting passage 23, the outlet chamber 45, the outlet port 26 and the conduit 9 to establish a fluid pressure $P_1$ in the brake chamber 7 and actuate said brake chamber which, in turn, rotates the slack adjuster 11 to energize the wheel brake assembly associated therewith (not shown). At the same time, pressure fluid also flows from the outlet chamber 45 through the passage 65 in the ratio piston 40, the valve chamber 54, the connecting passage 58, the outlet chamber 47, the outlet port 27 and the conduit 8 to establish a fluid pressure $P_2$ in the brake chamber 6 and actuate said brake chamber which, in turn, rotates the slack adjuster 10 to energize the wheel brake assembly associated therewith (not shown).

Since the ratio chamber 49 and the effective area $A_3$ of the ratio piston 40 are vented to atmosphere through the ratio port 29, the conduit 12, and the connecting port 15, the rotatable passage means 17 and the atmosphere port 16 of the two-way valve 13, the ratio of the magnitudes of the established fluid pressures $P_1$, $P_2$ are predetermined by the area ratio between opposed effective areas $A_1$, $A_2$ of the ratio piston 40 on which said fluid pressures $P_1$, $P_2$ act. For purposes of illustration, the effective area $A_2$ is disclosed as being predeterminately larger than the effective area $A_1$ by an amount equal to the effective area $A_3$ which is vented to atmosphere; therefore, opposing and substantially balanced forces are established across the ratio piston 40 wherein $P_1A_1=P_2A_2$. Since the area $A_2$ is predeterminately larger than the area $A_1$, it is apparent that the magnitude of the fluid pressure $P_1$ is also predeterminately greater than that of the fluid pressure $P_2$ and in ration therewith as predetermined by the ratio between areas $A_1$, $A_2$.

When the reaction force of the fluid pressure $P_2$ in the outlet chamber 47 acting on the effective area of the reaction piston 43 is substantially equal to the applied force, said reaction piston is moved upwardly against the compressive force of the metering spring 71 wherein the valve element 60 is positioned in lapped engagement with the valve seat 59 and the reaction piston valve seat 67 is positioned in lapped engagement with said valve element 60; and at the same time, the return spring 53 also moves the ratio piston 40 upwardly wherein the valve element 34 is positioned in lapped engagement with the housing valve seat 24 and the ratio piston valve seat 52 is positioned in lapped engagement with said valve element 34. In these lapped positions, it should be noted that the reaction force on the reaction piston is substantially equal and opposite to the manually applied force thereon, and as previously mentioned, the opposing forces $P_1A_1$ and $P_2A_2$ across the ratio piston 32 are also substantially equal and opposite. If greater braking effort is desired, the manually applied force is increased and the component parts of the application valve 3 function in the same manner as previously described to again move said component parts to their lapped positions.

When the desired braking effort is attained, the manually applied force is removed from the reaction piston 43 wherein the return spring 68 and the fluid pressure $P_2$ in the outlet chamber 47 serves to move said reaction piston upwardly to its original or inoperative position, and the valve spring 64 returns the valve element 60 into sealing engagement with the valve seat 59. Initially this upward movement sealably re-engages the valve element 60 with the valve seat 59 to again interrupt pressure fluid communication between the inlet and outlet ports 25, 27, and further upward movement of the reaction piston 43 disengages the extension valve seat 67 from said valve element to re-establish pressure fluid communication between said outlet port and the atmosphere and de-energize the wheel brake assembly associated therewith by exhausting the fluid pressure $P_2$ from the brake chamber 6 through the conduit 8, said outlet port, the outlet chamber 47, the connecting passage 58, the valve element exhaust opening 61, the ratio piston bore 55 and the exhaust opening 37 in the valve element 34 to the exhaust port 32. At the same time, the return spring 53 and the force $P_1A_1$ acting on the ratio piston 40 serves to move said ratio piston upwardly toward its original or inoperative position, and the valve spring 39 returns said valve element ino sealing engagement with the housing valve seat 24. Initially, this upward movement sealably re-engages the valve element seal 38 with the housing valve seat 24 to again interrupt pressure fluid communication between the inlet and outlet ports 25, 26, and further upward movement of the ratio piston 32 disengages the extension valve seat 52 from the valve element seal 38 to re-establish pressure fluid communication between said outlet port and the atmosphere and de-energize the wheel brake assembly associated therewith by exhausting the fluid pressure $P_1$ from the brake chamber 7 through the conduit 9, said outlet port, the outlet chamber 45, the housing connecting passage 23 and the valve element exhaust opening 37 to the exhaust port 32. It is apparent that the exhaustion of fluid pressures $P_1$, $P_2$, as above described, eliminates the opposing forces $P_1A_1$, $P_2A_2$ across the ratio piston 40 as well as the reaction force on the reaction piston 43.

When a substantially 1:1 ratio braking application is desired, the rotatable passage means 17 of the two-way valve 13 is moved counterclockwise (in the direction of the arrow) to its other position aligned between the two-way valve connecting ports 14, 15 and closing the atmosphere port 16 thereby providing open pressure fluid communication between the outlet chamber 45 and the ratio chamber 49 through the ratio ports 28, 29, and the conduit 12. A manually applied force on the force receiving plate 72 of the application valve 3 concertly moves the ratio and reaction pistons 40, 43 to actuate the valve elements 34, 60, and establish fluid pressures $P_1$ and $P_2$ in the outlet chambers 45, 47 as previously described; however, since the outlet and ratio chambers 45, 49 are connected in open pressure fluid communication, the fluid pressure $P_1$ not only acts on the effective area $A_1$ but also on the additive effective area $A_3$ creating a force $P_1(A_1+A_3)$ in opposition to that created by the fluid pressure $P_2$ in the outlet chamber 47 acting on the effective area $A_2$. Since the additive effective areas $A_1$, $A_3$ are substantially equal and opposite to the effective area $A_2$, it follows that the output fluid pressures $P_1$, $P_2$ are substantially equal to provide a substantially 1:1 ratio braking application.

Referring now to FIG. 2, a control valve 100 is shown for connection in the fluid pressure system 1 of FIG. 1. The control valve 100 is provided with a housing 101 having a bore 102 and an axially aligned counterbore 103 therein. A housing extension 104 is intergally provided on the end wall of the bore 102 having a valve seat 105 on the free end thereof, and a passage 106 extends coaxially through said extension and valve seat forming an exhaust opening or port. An inlet port 107 which receives the conduit 4 is provided in the housing 101 connecting with the counterbore 103 near the mid-portion thereof, and an outlet port 108 which receives the conduit 9 is provided in said housing connecting with the bore 102. Another outlet port 109 which receives the conduit 8 is also provided in the housing 101 connecting with the counterbore 103 between the mid-portion and upper end portion thereof. A pair of connecting ports 110 111 which receive the conduit 12 are also provided in the housing 101 intersecting with the housing bore and counterbore 102, 103 adjacent the lower ends thereof, respectively.

A stepped valve control member or ratio piston, indicated generally at 112, is provided with a body portion 113 slidable in the bore 102 and defining therewith an outlet chamber 114 normally in open pressure fluid communication with the exhaust and outlet ports 106, 108, and spaced radially extending flanges 115, 116 are provided on said piston body portion in sliding engagement with the counterbore 103 on opposite sides of the inlet port 107. Seals 117, 118 are carried in the flanges 115, 116 in sealing engagement with the counterbore 103, and another seal 119 is carried in the piston body 113 adjacent to the lower end thereof in sealing engagement with the housing bore 102. A peripheral groove 120 is provided in the piston body 113 between the flanges 115, 116 in open pressure fluid communication with the inlet port 107 at all times. The piston body 113 is also provided with an axial valve bore 121 having seals 122, 122a positioned therein near the upper and lower opposed ends of said bore, and counterbores 123, 123a are aligned in said piston body with the upper and lower opposed ends of said valve bore. Walls or seating members 124, 124a are sealably positioned in the counterbores 123, 123a and retained therein against displacement by snap ring and groove assemblies 125, 125a provided adjacent the upper and lower ends of said counterbores, respectively. Inlet or valve chambers 126, 126a are defined in the counterbores 123, 123a by the wall members 124, 124a and include the peripheral groove 120 in the piston body 113 and passages 127, 127a connected between said peripheral groove and said counterbores, respectively. Valve seats 128, 128a are provided on the wall members 124, 124a in the inlet chambers 126, 126a, and connecting passages 129, 129a extend coaxially through said valve seats and wall members.

Valve elements 130, 130a are slidably received in the valve bore 121 in sealing engagement with the seals 122, 122a therein. The valve elements 130, 130a are provided with axial bores or exhaust openings 131, 131a therethrough in open pressure fluid communiction with the valve bore 121, and annular resilient seals or discs 132, 132a are carried on said valve elements in circumscribing relation with said exhaust openings. Valve springs 133, 133a are biased between the valve elements 130, 130a and the piston body 113 normally urging the valve seals 132, 132a into sealing engagement with the wall member valve seats 128, 128a, and a return spring 134 is interposed between the piston body flange 116 and the housing 101 to normally maintain the valve seal 132a in predetermined spaced relation with the exhaust valve seat 105 on the housing extension 104.

Another valve control member or reaction piston 135 is slidably received in the housing counterbore 103 between the upper end thereof and the outlet port 109, and a seal 136 is carried in said reaction piston in sealing engagement with said housing counterbore. Another outlet or reaction chamber 137 is formed in the housing counterbore 103 between the upper end of the piston body 113 and the reaction piston 135 in open pressure fluid communicatio nwith the outlet port 109. The reaction piston 135 is provided with an integral extension 138 having a valve seat 139 on the lower or free end thereof, and said valve seat is normally maintained in predetermined space relation with the seal 132 of the valve element 130 by a return spring 140 biased between the piston body flange 115 and the reaction piston 135. An auxiliary exhaust passage or opening 141 extends coaxially through the piston extension 138 and valve seat 139 and connects with a metering spring bore 142 in the reaction piston 135. A precompressed metering spring 143 is provided in the metering spring bore 142 and biased between the reaction piston 135 and a vented retainer or treadle force receiving plate 144 slidable in said metering springe bore. The plate 144 is normally urged by the metering spring 141 into abutting engagement with displacement prevention means, such as the snap ring and groove assembly 145, provided in the reaction piston 135 adjacent to the uper end of the metering spring bore 142.

To complete the description of the control valve 100, the lower end of the piston body 133 is provided with an effective area $A_1$ in the outlet chamber 114, and the upper end of said piston body is provided with another effective area $A_2$ in the outlet chamber 137. The piston body flange 116 defines with the housing 101 an expansible ratio or control chamber 146 which is connected in open pressure fluid communication with the ratio port 111, and an annular intermediate effective area $A_3$ is provided on the piston body flange 116 in the control chamber 146. As shown for purposes of illustration, the cross-sectional area of the effective area $A_3$ is substantially equal to the difference of the cross-sectional areas of the effective areas $A_1$ and $A_2$.

In the operation, assume that the component parts of the system 1 and application valve 100 are positioned as described and shown to effect a ratio braking application. If the operator desires to effect a ratio braking application, a manually applied force on the force receiving plate 144 concertly moves the ratio and reaction pistons 112, 135 downwardly against the compressive forces of the return springs 134, 140 which are for purposes of illustration assumed to be balanced. This downward movement of the ratioed reaction pistons 112, 135 serves to initially engage the valve element 130a with the housing valve seat 105 and the valve seat 139 on said reaction piston with the valve element 130 to close the exhaust openings 131, 131a and the exhaust port 106; therefore, pressure fluid communication between the outlet ports 108, 109 and the exhaust port 106 is interrupted. Further downward movement of the ratio and reaction pistons 112, 135 serves to disenageg the valve seat 128a on the wall member 124a from the valve 130a and to disengage the valve 130 from the valve seat 128 on the wall member 124 thereby opening connecting passages 129, 129a to establish pressure fluid communication between the inlet port 107 and outlet ports 108, 109. In this manner, pressure fluid flows from the reservoir 5 through the conduit 4 and the inlet port 107 into the valve chambers 126, 126a. From the valve chamber 126a the pressure fluid flows through the connecting passage 129a, the outlet chamber 114, the outlet port 108 and the conduit 9 to establish a fluid pressure $P_1$ in the brake chamber 7 and actuate said brake chamber which, in turn, rotates the slack adjuster 11 to energize the wheel brake assembly associated therewith (not shown). At the same time, the pressure fluid also flows from the valve chamber 126 through the connecting passage 129, the outlet chamber 137, the outlet port 109 and the conduit 8 to establish a fluid pressure $P_2$ in the brake chamber 6 and actuate said brake chamber which, in turn, rotates the slack adjuster 10 to energize the wheel brake assembly associated therewith (not shown).

Since the control chamber 146 is vented to the atmosphere through the ratio port 111, the conduit 12, and the connecting port 15, passage means 17 and atmosphere port 16 of the two-way valve 13, the ratio of the magnitudes of the established fluid pressures $P_1$, $P_2$ are predetermined by the area ratio between the opposed effective areas $A_1$, $A_2$ of the ratio piston 112 on which the fluid pressures $P_1$, $P_2$ act. For purposes of illustration, the effective area $A_2$ is disclosed as being predeterminately larger than the effective area $A_1$ by an amount equal to the area $A_3$ which is vented to atmosphere; therefore, opposing and substantially balanced forces are established across the ratio piston 112 wherein $P_1 A_1 = P_2 A_2$. Since the area $A_2$ is predeterminately larger than that of the area $A_1$, it is apparent that the magnitude of the fluid pressure $P_1$ is also predeterminately greater than that of the fluid pressure $P_2$ and in ratio therewith as predetermined by the ratio between areas $A_1$, $A_2$.

When the reaction force of the fluid pressure $P_2$ in the outlet chamber 137 acting on the effective area of the reaction piston 135 is substantially equal to the applied force, said reaction piston is moved upwardly against the compressive force of the metering spring 143 wherein the valve element 130 is positioned in lapped engagement with the valve seat 128 on the ratio piston wall member 124 and the reaction piston valve seat 139 is positioned in lapped engagement with the valve element 130; and at the same time, the return spring 134 also moves the ratio piston 112 upwardly wherein the valve element 130a is positioned in lapped engagement with the housing valve seat 105 and the valve seat 128a on the ratio piston wall member 124a. In these lapped positions, it should be noted that the reaction force on the reaction piston 135 is substantially equal and opposite to the applied force thereon, and as previously mentioned, the opposing forces $P_1 A_1$ and $P_2 A_2$ across the ratio piston 112 are also substantially equal and opposite. If greater braking effort is desired, the manually applied force is increased and the component parts of the application valve 100 function in the same manner as previously described to again move said component parts to their lapped positions.

When the desired braking effort is attained, the manually applied force is removed from the reaction piston 135 wherein the compressive force of the return spring 140 and the reaction force serves to move said reaction piston upwardly to its original or inoperative position, and the valve spring 133 returns the valve element 130 into sealing engagement with the valve seat 128 on the reaction piston wall member 124. Initially, this upward movement sealably re-engages the valve element 130 with the valve seat 128 to again interrupt pressure fluid communication between the inlet and outlet ports 107, 109, and further upward movement of the reaction piston 135 disengages the extension valve seat 139 from said valve element to re-establish pressure fluid communication between the outlet and exhaust ports 109, 106 and de-energize the wheel brake assembly associated therewith by exhausting the fluid pressure $P_2$ from the brake chamber 6 through the conduit 8, said outlet port, the outlet chamber 137, the connecting passage 129, the valve exhaust openings 131, 131a and ratio piston valve bore 121 to said exhaust port. At the same time, the return spring 134 and the force $P_1 A_1$ acting on the ratio piston 112 serves to move said ratio piston upwardly toward its original or inoperative position. Initially this upward movement sealably re-engages the valve seat 128a on the ratio piston wall member 124a with the valve element 130a to again interrupt pressure fluid communication between the inlet and outlet ports 107', 108, and further upward movement of the ratio piston 112 disengages said valve element 130a from the housing valve seat 105 to re-establish pressure fluid communication between the outlet and exhaust ports 108, 106 and de-energize the wheel brake assembly associated therewith by exhausting the fluid pressure $P_1$ from the brake chamber 7 through the conduit 9, said outlet port and the outlet chamber 114 to said exhaust port 106. It is apparent that the exhaustion of fluid pressure $P_1$, $P_2$, as above described, eliminates the opposing forces $P_1 A_1$ $P_2 A_2$ across the piston 112 as well as the reaction force on the reaction piston 135.

When a substantially 1:1 ratio braking application is desired, the rotatable passage means 17 of the two-way valve 13 is moved counterclockwise (in the direction of the arrow) to its other position aligned between the two-way valve connecting ports 14, 15 and closing the atmosphere port 16 thereby providing open pressure fluid communication between the outlet and ratio chambers 114, 146 through the ratio ports 110, 111, and the conduit 12. A manually applied force on the force receiving plate 144 of the application valve 100 concertly moves the ratio and reaction pistons 112, 135 to actuate the valve elements 130, 130a and establish fluid pressures $P_1$ and $P_2$ in the outlet chambers 114, 137, as previously described; however, since the outlet and ratio chambers 114, 146 are connected in open pressure fluid communication, the fluid pressure $P_1$ not only acts on the effective area $A_1$ but also on the additive effective area $A_3$ creating a force $P_1(A_1+A_3)$ in opposition to that created by the fluid pressure $P_2$ in the outlet chamber 137 acting on the effective area $A_2$. Since the additive effective areas $A_1$, $A_3$ are substantially equal and opposite to the effective area $A_2$, it follows that the output fluid pressures $P_1$, $P_2$ are substantially equal to provide a substantially 1:1 ratio braking application.

From the foregoing, it is now apparent that novel control values and systems therefor meeting the objects set out hereinbefore are provided and that changes or modifications as to the precise configurations, areas, shaped or details of the construction set forth in the disclosure by way of illustration may be made by those skilled in the art without departing from the spirit of the invention as defined by the claims which follow. The embodiments of the invention in which an exclusive property or privilege is claimed are defined as follows:

1. In a fluid pressure system having a source of fluid pressure and a pair of pressure fluid responsive motors, a control valve including a housing, a pair of valve control members movable in said housing, means within said housing including one of said valve control members providing a pressure fluid flow passage between said source and one of said motors, other means within said housing including said valve control members providing another pressure fluid flow passage between the other of said motors and said first named flow passage, a pair of valve means in said housing and said one valve control member controlling pressure fluid flow through said first named and other flow passages, respectively, said valve control members being movable in response to an applied force to engage and move said valve means to positions establishing pressure fluid flow from said source through said first named flow passage to said one motor and from said first named flow passage through said other flow passage to said other motor, and opposed surfaces on said one application means having proportional effective areas responsive to the established pressure fluid flows through said first named and other flow passages, respectively, said one application means being movable in response to the fluid pressures of the established pressure fluid flows acting on the proportional surface areas thereof to predeterminately proportion the fluid pressure magnitudes between the established pressure fluid flows.

2. In a fluid pressure system having a source of fluid pressure and a pair of fluid pressure responsive motors, a control valve including a housing, a pair of concertly and relatively movable valve control members in said housing, means within said housing including said valve control members providing a pair of pressure fluid flow passages between said source and each of said motors, a pair of valve means in one of said valve control members controlling pressure fluid communication through said flow passages, a pair of valve seats on said housing and the other of said valve control members for engagement with said valve means, respectively, said valve control members being concertly movable in response to an applied force to engage said valve seats and said valve means and move said valve means to positions in said flow passages establishing pressure fluid communication between said source and each of said motors, and opposed surfaces on said one valve control member respectively responsive to the established fluid pressures at said motors, said one valve control member being relatively movable in response to the established fluid pressures acting on said opposed surfaces to predetermine the ratio of the fluid pressure magnitudes of the established fluid pressures.

3. In a fluid pressure system having a fluid pressure source and a pair of fluid pressure responsive motors, a control valve including a housing, a pair of concertly and independently movable valve control members in said housing, means within said housing including said valve control members providing a pair of pressure fluid flow passages between said source and each of said motors, a pair of valve means in one of said valve control members normally interrupting pressure fluid communication through said flow passages between said source and motors and establishing pressure fluid communication between said motors and the atmosphere, a pair of valve seats on said housing and on the other of said valve control members for engagement with said valve means, respectively, said valve control members being concertly movable in response to an applied force to engage said valve seats with said valve means interrupting pressure fluid communication between said motors and the atmosphere and then move said valve means to positions in said flow passages establishing pressure fluid communication between said source and each of said motors, opposed portions on said one valve control member and responsive to the established fluid pressures at said motors, an intermediate portion on said one valve control member opposing one of said end portions and defining with said housing a ratio chamber, and selectively operable means movable between one position connecting said chamber in pressure fluid communication with the established fluid pressure at one of said motors and another position interrupting pressure fluid communication between said chamber and said one motor and venting said chamber to the atmosphere, respectively, said one valve control member being independently movable in response to the established fluid pressure acting on said opposed end portions when said selectively operable means is in the one position to provide a ratio between the magnitudes of the established fluid pressures and said one valve control member also being independently movable in response to the established fluid pressure acting on said opposed end portions when said selectively operable means is in the other position thereof to provide another ratio between the magnitudes of the established fluid pressures different than said first named ratio.

4. In a fluid pressure system having a fluid pressure source and a pair of fluid pressure responsive motors, a control valve including a housing, a pair of valve control members in said housing, means within said housing including said valve control members providing a pair of pressure fluid flow passages between said source and said motors, a pair of valve means in one of said valve control members controlling pressure fluid flow through said flow passages between said source and each of said motors, and a pair of valve seats on the other of said valve control members and said housing for operative engagement with said valve means, respectively, said valve control members being movable in response to an applied force to engage said valve seats and said valve means and then move said valve means to positions in said flow passages establishing pressure fluid flow therethrough between said source and each of said motors.

5. A control valve for fluid pressure comprising a housing having an inlet port and a pair of outlet ports therein, a pair of valve control members movable in said housing, valve means controlling pressure fluid communication between said inlet port and one of said outlet ports, and other valve means in one of said valve control members controlling pressure fluid communication between said outlet ports, said valve control members being movable in response to an applied force to engage and move said first named and other valve means to positions establishing pressure fluid communication between said inlet port and each of said outlet ports, a pair of opposed surfaces on said one valve control member in open pressure fluid communication with said outlet ports, respectively, said one valve control member being responsive to the established fluid pressures at said outlet ports respectively acting on said opposed surfaces to predetermine the ratio of the magnitude of the established fluid pressures at said outlet ports.

6. A control valve for fluid pressure comprising a housing having an inlet port and a pair of outlet ports therein, a pair of concertly and relatively movable valve control members in said housing, a pair of valve means in one of said valve control members controlling pressure fluid communication between said inlet port and said outlet ports, a pair of valve seats on the other of said valve control members and said housing for operative engagement with said valve means, respectively, said valve control members being concertly movable in response to an applied force to engage said valve seats with said valve means and move said valve means to positions establishing pressure fluid communication between said inlet port and each of said outlet ports, and a pair of opposed surfaces on said one valve control member in open pressure fluid communication with the established fluid pressures at said outlet ports, respectively, said one valve control member being relatively movable in response to the established fluid pressures acting on said opposed surfaces to predetermine the ratio of the magnitudes of the established fluid pressures at said outlet ports.

7. A control valve for fluid pressure comprising a housing having an inlet port and first and second outlet ports therein, a pair of valve control members, one of said valve control members being movable in said housing between said outlet ports, valve means in said one valve control member controlling pressure fluid communication between said outlet ports, other valve means in said housing controlling pressure fluid communication between said inlet port and one of said first and second outlet ports, said valve control members being movable in response to an applied force to engage and move said first named and other valve means to positions establishing pressure fluid communication between said inlet port and said first and second outlet ports, opposed end portions on said one valve control member respectively responsive to the established fluid pressure at said outlet ports, an intermediate portion on said one valve control member opposing one of said end portions and defining with said housing a ratio chamber for selective connection with the atmosphere and with the established fluid pressure at one of said first and second outlet ports, the magnitudes of the established fluid pressures at said outlet ports being in a predetermined ratio when said chamber is connected in pressure fluid communication with the atmosphere and in a ratio different than the predetermined ratio when said chamber is connected in pressure fluid communication with said one outlet port.

8. In a fluid pressure system having a pair of fluid pressure responsive motors for connection in parallel system relation with a fluid pressure source, control means including a pair of application means movable therein and defining therewith a pair of pressure fluid flow passages, one of said flow passages being connected between said source and one of said motors and the other of said flow passages being connected between the other of said motors and said one flow passage, said pair of application means being movable in response to an applied force to positions in said flow passages effecting the application of fluid pressure therethrough.

9. In the fluid pressure system according to claim 8, including a pair of opposed end portions on one of said application means respectively responsive to the applied fluid pressures in said flow passages, said one application means being relatively movable in response to the applied fluid pressures acting on said opposed end portions to predetermine the ratio of the fluid pressure magnitudes of the applied fluid pressures.

10. In the fluid pressure system according to claim 8, wherein said application means comprises a pair of valve control members, and a pair of valve means in said pair of flow passages controlling pressure fluid flow therethrough, respectively, said valve control members being movable in response to the applied force to engage and move said valve means to positions in said flow passages establishing pressure fluid flow therethrough.

11. In the fluid pressure system according to claim 10 wherein said one flow passage includes a valve chamber in said control means connected in pressure fluid communication with said source, and a first passage in said control means having one end connected in pressure fluid communication with said one motor and the other end thereof connected with said valve chamber, one of said valve means being movable in said valve chamber and normally urged to a position closing said first passage to interrupt pressure fluid communication between said source and one motor, said other flow passage including another valve chamber in one of said application means connected in pressure fluid communication with said one flow passage between said one motor and said one end of said first passage, and a second passage in said one application means having one end connected in pressure fluid communication with said other motor and the other end thereof connected with said other valve chamber, the other of said valve means being movable in said other valve chamber and normally urged to a position closing said second passage to interrupt pressure fluid communication between said one and other motors, and means on said one application means and the other of said application means for respective operative engagement with said one and other valve means, said last named means being movable in response to the applied force movement of said application means to engage and move said one and other valve means to positions in said one and other valve chambers opening said first and second passages to establish pressure fluid communication between said source and said one and other motors, respectively.

12. A control valve comprising a housing having an inlet port and a pair of outlet ports therein, a pair of valve control members movable in said housing, valve means for controlling pressure fluid communication between said inlet port and one of said outlet ports, and other means in one of said valve control members connecting the other of said oulet ports to said one outlet port including other valve means for controlling pressure fluid communication between said one and other outlet ports, said pair of valve control members being movable in response to an applied force to engage and move said first named and other valve means to positions establishing pressure fluid communication between said inlet port and said one and other outlet ports, respectively.

13. The control valve according to claim 12 wherein said other means comprises passage means extending through said one valve control member and having opposed ends in pressure fluid communication with said one and other outlet ports, and a valve seat on said one valve control member in circumscribing relation with said passage means, said other valve means being normally urged into engagement with said valve seat to interrupt pressure fluid communication between said one and other outlet ports, and other passage means in said housing between said inlet port and said one outlet port, another valve seat on said housing in circumscribing relation with said other passage means, said first named valve means being normally urged into engagement with said other valve seat to interrupt pressure fluid communication between said inlet port and said one outlet port, said first named and other valve means being engaged and moved by said one and other valve control members in response to the applied force movement thereof to positions disengaged from said other and first named valve seats to establish pressure fluid communication between said inlet port and said one and other outlet ports, respectively.

14. The control valve according to claim 12 comprising an inlet chamber in said housing connected with said inlet port, said one valve control member defining with said housing an outlet chamber connected with said one outlet port, a wall on said housing between said inlet and outlet chambers, a passage in said wall between said inlet and outlet chambers, a valve seat on said wall in circumscribing relation with said passage, said first named valve means being movable in said inlet chamber and normally urged into engagement with said valve seat to close said passage and interrupt pressure fluid communication between said inlet and outlet chambers, another outlet chamber defined in said housing between said pair of valve control members and connected with said other outlet port, said other means including another passage in said one valve control member between said first named and other outlet chambers, and another valve seat on said one valve control member in circumscribing relation with said other passage, said other valve means being movable in said one valve control member and normally urged into engagement with said other valve seat to close said other passage and interrupt pressure fluid communication between said first named and other outlet chambers, and means on each of said one valve control member and the other of said valve control members for respective operative engagement with said first named and other valve means, said last named means being movable in response to the applied force movement of said pair of valve control members to engage and move said first named and other valve means to positions disengaged from said first named and other valve seats to open said first named and other passages and establish pressure fluid communication between said inlet chamber and said first named and other outlet chambers, respectively.

15. The control valve according to claim 6 comprising a pair of passages in said one valve control member having one of their ends connected in pressure fluid communication with said inlet port and the other of their ends respectively connected in pressure fluid communication with said outlet ports, another pair of valve seats on said one valve control member in circumscribing relation with said pair of passages, said pair of valve means being normally urged into engagement with said last named pair of valve seats to interrupt pressure fluid communication between said inlet port and each of said outlet ports, said pair of valve means being moved to positions disengaged from said last named pair of valve seats to open said pair of passages and establish pressure fluid communication between said inlet port and each of said outlet ports in response to the applied force movement of said valve control members subsequent to the engagement of said pair of valve means with said first named pair of valve seats.

16. The control valve according to claim 6 comprising a pair of inlet chambers in said one valve control member connected with said inlet port, said one valve control member defining with said housing an outlet chamber connected with one of said outlet ports, another outlet chamber defined in said housing between said pair of valve control members and connected with the other of said outlet ports, a pair of passages in said one valve control member having opposed ends connected with said pair of inlet chambers and said first named and other outlet chambers, respectively, another pair of valve seats on said one valve control member in circumscribing relation with said pair of passages, said pair of valve means being movable in said pair of inlet chambers and normally urged into engagement with said last named pair of valve seats to close said pair of passages and interrupt pressure fluid communication between said pair of inlet chambers and said first named and other outlet chambers, and said pair of valve means being moved to positions disengaged from said last named pair of valve seats to open said pair of passages and establish pressure fluid communication between said pair of inlet chambers and said first named and other outlet chambers in response to the applied force movement of said pair of valve control members subsequent to the engagement of said pair of valve means with said first named pair of valve seats, respectively.

17. A control valve comprising a housing having a bore and a pair of stepped counterbores therein, a wall on said housing between said bore and the smaller of said stepped counterbores, an inlet port in said housing connecting with said bore, a first outlet port in said housing and connected with said smaller stepped counterbore, a first valve seat on said wall and facing said bore, a first passage in said wall extending through said first valve seat between said bore and said smaller stepped counterbore, a first valve in said bore and normally urged into engagement with said first valve seat to close said first passage and interrupt pressure fluid communication between said inlet port and said first outlet port, a second outlet port in said housing and connected with the larger of said stepped counterbores, a first piston slidable in said pair of stepped counterbores between said first and second outlet ports, a first extension on said first piston movable through said first passage for operative engagement with said first valve, a valve chamber in said first piston, a second valve seat on said first piston facing said valve chamber, a second passage in said first piston extending through said second valve seat between said valve chamber and said larger stepped counterbore, a third passage in said first piston connected between said valve chamber and said smaller stepped counterbore, a second valve in said valve chamber and normally urged into engagement with said second valve seat to close said second passage and interrupt pressure fluid communication between said first and second outlet ports, a second piston slidable in said larger stepped counterbore, and a second extension on said second piston movable through said second passage for operative engagement with said second valve, said first and second pistons being movable in response to an applied force to engage said first and second extensions with said first and second valves and thereafter move said first and second valves to positions disengaged from said first and second valve seats to open said first and second passages and establish pressure fluid communication between said inlet port and each of said first and second outlet ports.

References Cited by the Examiner
FOREIGN PATENTS 798,816 7/1958 Great Britain.
92,118 9/1959 Netherlands.

BENJAMIN HERSH, *Primary Examiner.*

EUGENE G. BOTZ, *Examiner.*

M. S. SALES, *Assistant Examiner.*